S. F. FUCHS.
GRADUAL SHIFTING DRAFT HITCH.
APPLICATION FILED AUG. 7, 1914.
1,170,238. Patented Feb. 1, 1916.
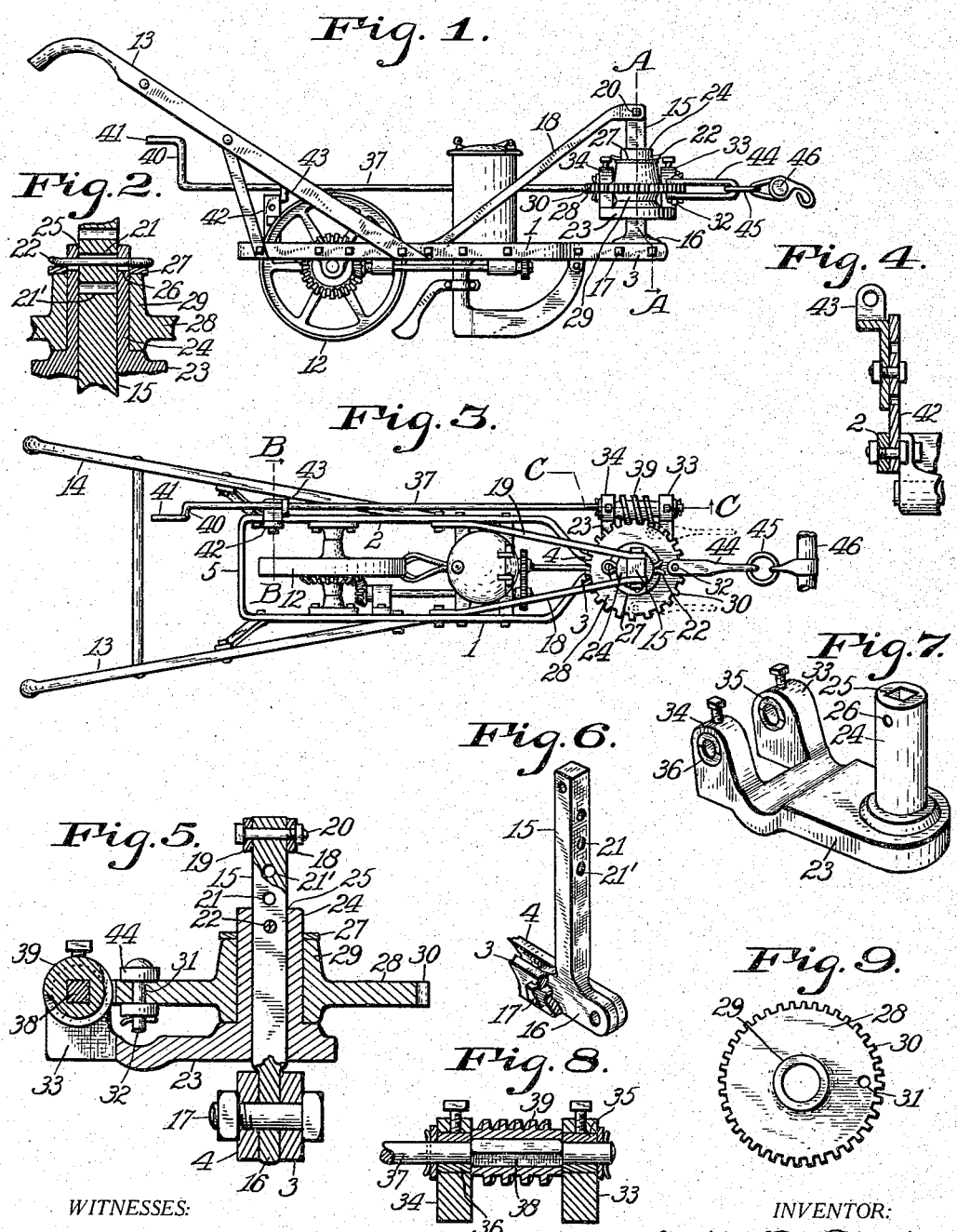
WITNESSES:
J. H. Gardner
M. E. Sparrow
INVENTOR:
Scott F. Fuchs,
BY
E. T. Silvius
ATTORNEY.

UNITED STATES PATENT OFFICE.

SCOTT F. FUCHS, OF UNION TOWNSHIP, SHELBY COUNTY, INDIANA.

GRADUAL-SHIFTING DRAFT-HITCH.

1,170,238.  Specification of Letters Patent.  Patented Feb. 1, 1916.

Application filed August 7, 1914. Serial No. 855,542.

*To all whom it may concern:*

Be it known that I, SCOTT F. FUCHS, a citizen of the United States, residing in Union township, in the county of Shelby and State of Indiana, have invented a new and useful Gradual-Shifting Draft-Hitch, of which the following is a specification, reference being had to the accompanying drawings and to the letters and figures of reference marked thereon.

This invention relates to an appliance whereby a draft animal may be hitched to a vehicle, especially to a grain drill, the invention having reference more particularly to a draft hitch that is adjustable laterally so as to enable the draft animal to draw the drill or implement to either side of the line of draft.

An object of the invention is to provide an improved draft hitch that shall be so constructed as to be adapted to be shifted graduatedly to various degrees and under perfect control while the implement to which it may be connected is in operation.

A more specific object is to provide a shiftable draft hitch for one-horse grain drills of the type that is designed for drilling grain between rows of growing corn, which draft appliance shall be so constructed as to enable the operator to quickly change the course of the drill so as to run around irregular hills of corn or corn stalks that may be elbowed or bent over from the line of the row of hills, and while the draft animal pursues a straight course between the rows of corn or other growing stalks.

A still further object is to provide an improved shiftable draft hitch which shall be adapted to be connected to various types of farming implements without great expense, and which shall be effective, durable, and economical in use for the prevention of injury to the growing crops.

With the above-mentioned and other objects in view, the invention consists in a draft hitch appliance adapted to be gradually shifted from side to side, and means for shifting and controlling the position of the point of draft relatively to the frame of the implement or vehicle to which it is applied, the invention consisting further in the novel parts and in the combinations and arrangements of parts as hereinafter particularly described and further defined in the accompanying claims.

Referring to the drawings,—Figure 1 is a side elevation of one type of grain drill provided with the improved draft hitch; Fig. 2 is a fragmentary vertical section of the appliance at right angles to and on the plane of the line A A on Fig. 1; Fig. 3 is a top plan of the grain drill and the draft appliance; Fig. 4 is a fragmentary vertical section on the line B B on Fig. 3; Fig. 5 is a section on the line A A on Fig. 1; Fig. 6 is a perspective view of parts of the invention; Fig. 7 is a perspective view of the frame portion of the invention; Fig. 8 is a fragmentary section on the line C C on Fig. 3; and, Fig. 9 is a top plan of one of the parts of the improved draft hitch.

Similar reference characters on the different figures of the drawings indicate corresponding elements or features of construction herein referred to in detail.

For the purpose of clearly illustrating and describing the construction and mode of operation of the invention, it is shown as applied to a common type of one-horse power grain drill which includes a frame comprising two side bars 1 and 2 which are set in each toward the other to form draw bars 3 and 4 on the forward end of the frame, a cross bar 5 being connected to the rear ends of the side bars. The frame is provided with handles 13 and 14 for guiding and controlling the implement.

The improved draft appliance comprises a standard or post 15 which is square or rectangular in cross-section and has a suitable foot 16 which is secured by means of bolts 17 to the draw bars 3 and 4 to uprightly support the standard. Two braces 18 and 19 are secured to the side bars 1 and 2 and extend upward and forward to the upper portion of the standard 15 and are secured to the latter by means of a bolt 20. The standard has a suitable number of horizontal pin holes 21, 21', in one of which is a removable pin or cotter 22.

A novel frame is provided which comprises a base plate 23 having a vertical journal or shaft 24 fixed thereon in which is a squared aperture 25 that extends therethrough and through the base plate and receives the standard or post 15, the latter preventing rotary movement of the frame relatively to the frame of the grain drill. The journal or shaft 24 has a pin hole 26 therein which receives the pin or cotter 22 whereby the frame is supported on the standard so as to be adjustable as to height thereon by shifting the pin or cotter to different holes in the standard, a washer 27 preferably being placed on the journal or shaft beneath the pin or cotter. A gear wheel 28 is provided which has a hub 29 that is rotatably mounted on the journal or shaft 24 beneath the washer 27, and it has gear teeth 30 thereon and also has a pin hole 31 arranged near the periphery of the wheel for adapting the wheel to perform the function of a part of the draft device, the hole being adapted to receive a pivotal draft pin 32 which is shifted as may be required on rotation of the wheel. The wheel 28 preferably is a complete rotatable wheel with teeth on all of its periphery so that it is adapted for reversibility of the appliance, but in some cases, as will be understood, a portion of the periphery may be devoid of gear teeth.

The frame plate 23 extends transversely of the drill frame and has two journal boxes 33 and 34 thereon that preferably have halved journal brasses or bearings 35 and 36 therein, respectively, and which horizontally support a rotatable shaft 37 preferably having a squared portion 38 on which a worm 39 is mounted so as to be in mesh with the gear teeth 30 of the shiftable draft device. It will be understood that the base plate 23 may be reversed if desired, so that the worm shall be on the right hand side of the drill frame instead of being on the left hand side as shown. The shaft 37 is provided with a crank arm 40 having a handle 41, the shaft being of suitable length so that the handle is in proximity to the position of the operator of the implement. A standard 42 is mounted on the frame of the grain drill in proximity to the rear end thereof and has an adjustable bearing portion 43 which supports the rearward portion of the shaft 37, so that the rearward portion of the shaft may be raised or lowered when the draft appliance is vertically adjusted on the standard 15. A clevis or shackle 44 is connected to the wheel 28 by means of the draft pin 32 for hitching the draft animal or a tractor to the vehicle frame, preferably by means of a link 45 and a swingle-tree 46.

In case it is desired to reverse the draft hitch appliance, it will be understood that the shaft support 43 will be transferred to the opposite side of the drill frame so as to guide the shaft 37 when it is transferred to the opposite or right hand side, in such case the wheel 28 remaining in its usual position relatively to the drill frame.

In practical use the grain drill or implement is drawn forward by means of the clevis or shackle 44 and the device to which it is connected, the position of the pin 32 being forward of the standard or post 15 for drawing the drill or implement in a straight line. If it is desired to turn the implement toward the right hand side while in motion, the shaft 37 is rotated so as to cause the wheel 28 to rotate and carry the draft pin 32 around toward the left hand side of the standard or post, the reverse operation being performed for turning the machine so as to run toward the left hand side. When the draft pin is in the desired position it is so retained by means of the worm 39 in engagement with the teeth 30 of the draft pin carrier, and as will be understood, the draft pin may be either gradually or quickly shifted in position much or little as may be desired.

Having thus described the invention, what is claimed as new, is—

1. A shiftable draft hitch including a supporting frame and a journal integral thereon, a wheel rotatably mounted on the journal and having gear teeth on its periphery and also a pivotal draft pin adjacent to the periphery, a clevis embracing the peripheral portion of the wheel and connected to the draft pin, and a worm rotatably mounted on the frame in mesh with the teeth of the wheel.

2. A shiftable draft hitch including a standard that is squared in cross-section, a frame having a journal thereon, the journal having a squared aperture extending therethrough and through the frame corresponding to and receiving the squared standard, a draft device rotatably mounted on the journal and having gear teeth, a clevis pivotally connected to the draft device, and a worm rotatably mounted on the frame in connection with the teeth of the draft device.

3. A shiftable draft hitch including a standard having a supporting foot on its lower end and two braces secured to its upper end portion, the braces extending divergently each from the other and downwardly to the plane of the foot of the standard, a frame non-rotatably mounted on the standard and having a hollow journal thereon through which the standard extends, a draft device rotatably mounted on the journal and having gear teeth, a clevis pivotally connected to the draft device, and a worm rotatably mounted on the frame in connection with the teeth of the draft device.

4. A shiftable draft hitch including a standard having pin holes, a frame adjustably mounted on the standard and provided with a journal having a pin hole, a supporting pin in the pin hole of the journal and extending in one of the pin holes of the standard, a draft device rotatably mounted on the journal and having gear teeth, a clevis pivotally connected to the draft device, and a worm rotatably mounted on the frame in connection with the teeth of the draft device and provided with an operating device.

5. The combination with a movable implement frame, of a standard vertically secured to the forward portion of the implement frame, a base plate having a vertical journal thereon and adjustably mounted on the standard to be raised or lowered, said plate having two journal boxes thereon, a wheel rotatably mounted on the vertical journal and having gear teeth on its periphery, said wheel having a pivotal draft pin in proximity to the periphery thereof, a clevis embracing the peripheral portion of said wheel and connected to said draft pin, a controlling shaft rotatably mounted in said boxes and extending toward the rear portion of the implement frame, said shaft having a crank arm on its rear end, a guide mounted on the rear portion of the implement frame and adjustably supporting the shaft in proximity to the crank arm, and a worm mounted on and rotated by the controlling shaft in mesh with the teeth of said wheel.

In testimony whereof, I affix my signature in presence of two witnesses.

SCOTT F. FUCHS.

Witnesses:
GEO. H. MEIKS,
CHARLES A. HACK.

Copies of this patent may be obtained for five cents each, by addressing the "Commissioner of Patents, Washington, D. C."